CONFERENCE CIRCUIT WITH SUPPRESSED SIDETONES

Filed July 13, 1964 3 Sheets-Sheet 1

INVENTORS.
FRANK NIERTIT
FERENC PANKOTAY
JACK SHIRMAN
George J. Seligsohn
ATTORNEY Aug. 27, 1968 F. NIERTIT ET AL 3,399,275

CONFERENCE CIRCUIT WITH SUPPRESSED SIDETONES

Filed July 13, 1964 3 Sheets-Sheet 3

United States Patent Office 3,399,275

Patented Aug. 27, 1968

3,399,275
CONFERENCE CIRCUIT WITH SUPPRESSED SIDETONES

Frank Niertit, West Webster, and Ferenc Pankotay and Jack Shirman, Rochester, N.Y., assignors, by mesne assignments, to Stromberg-Carlson Corporation, Rochester, N.Y., a corporation of Delaware Filed July 13, 1964, Ser. No. 382,188
9 Claims. (Cl. 179—1)

ABSTRACT OF THE DISCLOSURE

In a conference call circuit interconnecting multiple stations, each station having its individual input to the circuit and its individual output from the circuit, sidetone feedback is suppressed by inverting the composite of several of the inputs, combining that inverted composite with the composites of other similar groups of inputs, and combining the resulting larger composite at each individual station's output with the input from that station thereby cancelling from each station's output that portion of the output signal contributed by its input.

This invention relates to telephone circuits in general and more particularly to conference networks with suppressed sidetone coupling wherein such conference networks are capable of application in a telephone system employing four-wire switching.

In prior art conference networks, in which a conference call is established through conventional telephone handsets at a telephone subscriber location, an inherent problem is created by sidetone coupling between the transmit and receive portions of a handset when employed in a conference call. The undesirable sidetone coupling occurs when a signal originating at the transmit portion of any subscriber's subset, after amplification by the conference network, is returned to the receive portion of the same subscriber's subset. If the amplification becomes sufficiently great, a singing effect is produced and communication is disrupted.

Conference call networks have been devised to reduce the sidetone coupling, but in many instances, they have not proved entirely effective and have placed a limitation on the capacity of the network, due to the prohibitive expense of additional equipment required.

For the purposes of this disclosure and for ease in illustrating an example of an application of this invention, a conference call is designated as a single group communication. In the single group communication, the parties are remotely located and the group conversation is conducted through a conference call network located at a central office telephone exchange. The conference call network has at least one input amplifier per group communication and at least one output amplifier per subscriber in the group. A conference call circuit is designated as the route taken by each party's voice signal as it travels from the transmit portion of that party's hand set through an input amplifier and output amplifier in a conference call network to the receive portion of each other party. A conference system is designated as one or more single group communications or one or more conference call networks. Thus, a conference system comprises at least one conference call network which in turn comprises a plurality of conference call circuits.

An effective means for eliminating substantially all of the singing caused by sidetone coupling between the transmit and receive portions in the handset of a subscriber making a conference call, regardless of the size of the conference, is contemplated by the invention. Utilization of a phase shifting means in the input portion of a conference call network is employed to create a 180 degree phase difference between the signals present at the input and the output of an input portion of the network. Individual input signals to the input portion and the 180 degree phase-shifted output of the phase shifting means are applied to ultrastable summing circuits at the input of an output section for the conference call network. With the foregoing arrangement, the summing circuits individually add the separate input signals to the input portion of the conference call network with a combined signal output of the phase shifting means. Due to the phase difference of 180 degrees, a talking party's own signal is canceled in the summing circuit of the output section of the conference call network at the central office exchange. Thus, the possibility of returning a party's own transmitted signal to the receive portion of his handset is eliminated. Consequently, the possibility of establishing a difference in energy level between the same signal transmitted and received is also eliminated together with the resultant undesirable sidetone coupling and singing effect.

Furthermore, means are provided for combining a plurality of conference call networks, to provide very large conferences, without in any way affecting the cancellation of each talking party's own signal.

It is therefore a primary object of this invention to provide a conference call network which utilizes a minimum of equipment to eliminate substantially all the undesirable sidetone effects incident to such a network.

An additional object of this invention is to provide a conference network which enables the interconnection of a large group of subscribers in a single conference call.

A further object of this invention is to provide a conference call system which has the capacity of handling a large number of individual conference calls.

With the foregoing and other objects in view, the invention resides in the following specification and appended claims, certain embodiments and details in structure of which are illustrated in the accompanying drawings, in which:

Figure 4:
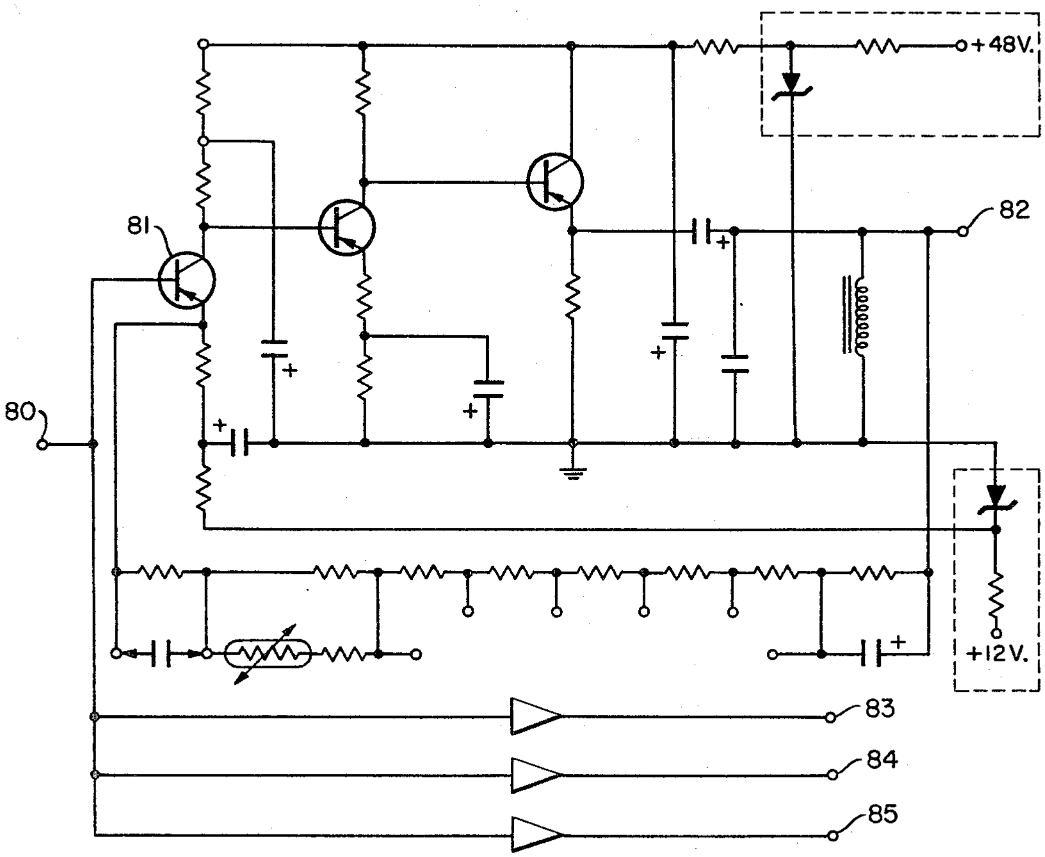
Figure 5:
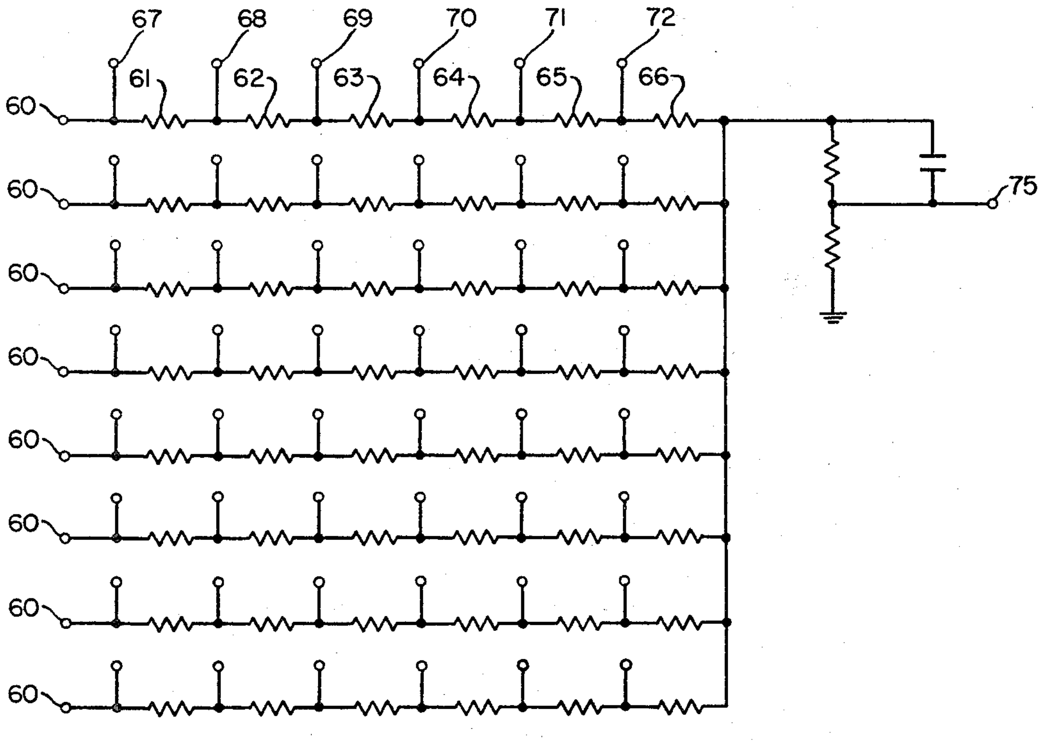

FIGURE 4 illustrates a system of group conference amplifiers and a possible circuit configuration for one of the group amplifiers which may be employed in a conference system within the contemplation of this invention; and FIGURE 5 illustrates a signal combining attenuator pad arrangement which may be employed to interconnect a plurality of input amplifiers of several conference call networks and a group amplifier in an overall conference system within the contemplation of this invention.

Figures 1, 2:
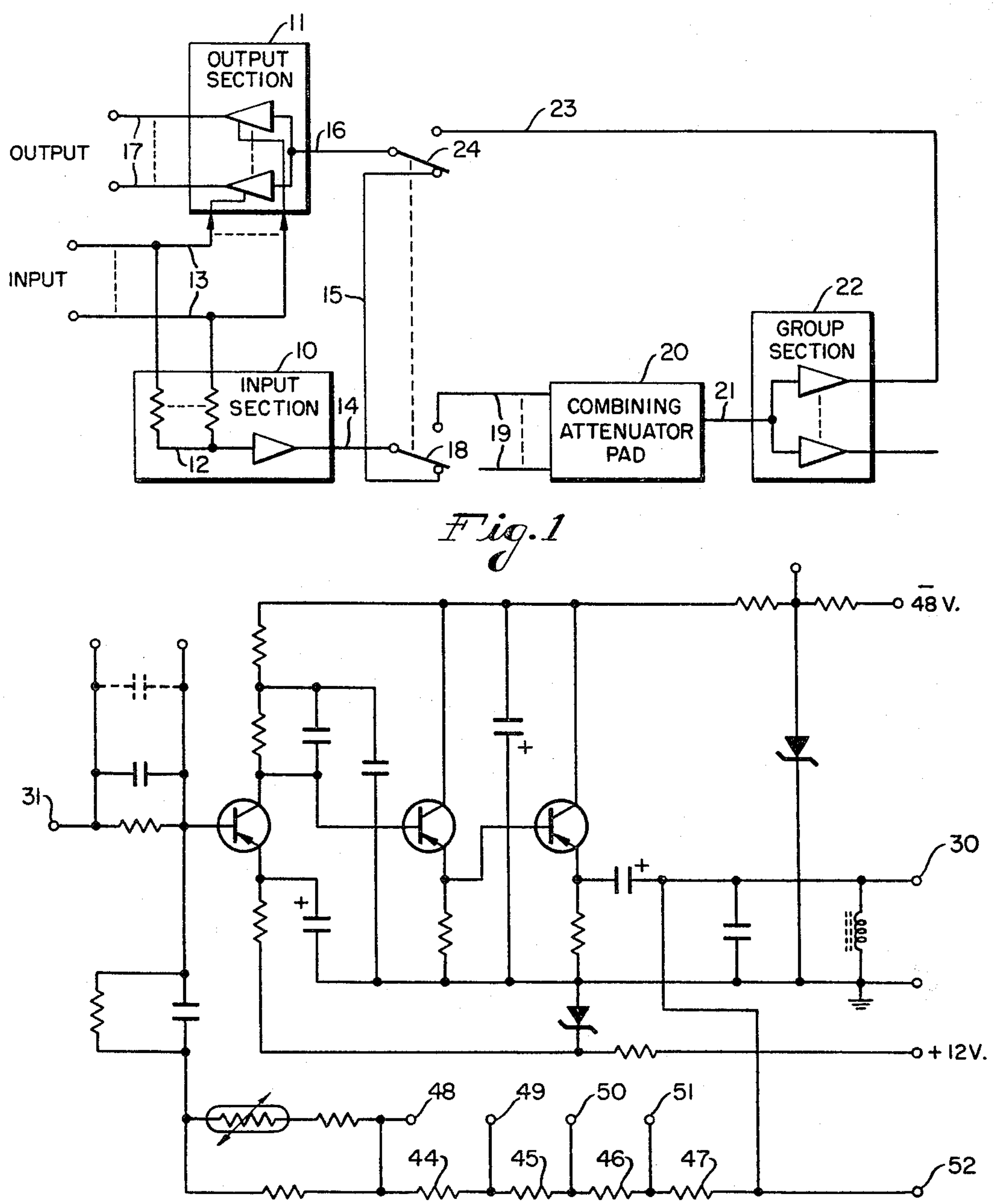
FIGURE 1 illustrates a general block diagram of the component arrangement of a conference call network and a conference system within the contemplation of this invention.
FIGURE 2 illustrates a conventional audio amplifier which may be employed as an input amplifier in a conference call network as illustrated by the general block diagram of FIGURE 1.

Referring more particularly to the drawings, the block diagram of FIGURE 1 illustrates a general arrangement for sidetone suppression in a conference call network within the contemplation of this invention. The conference call network consists basically of an input section 10 and an output section 11. Included in section 10 is a phase shifting means and included in section 11 are a plurality of signal summing circuits and amplifiers. A common input connection for all parties in a conference call is indicated at 12 as the input to section 10. Prior to application at 12, each individual subscriber signal may be subjected to any suitable switching means capable of converting the signals on a conventional two-wire telephone transmission system to a four-wire system.

Each individual party's input signal, in addition to being combined and applied at 12 to section 10, is also applied individually via conductors 13 to an appropriate output amplifier in section 11 connected to the same party's conference call set. Input section 10 is equipped with a phase shifting means preferably capable of producing an output signal at 14 phase shifted by practically exactly 180 degrees from the input at 12. In a single conference call network, the common output of section 10 is applied, through switches 18 and 24 via conductor 15, to the common input 16 for the output section 11. With each individual party's input signal on conductor 13 applied to a suitable summing circuit, not shown, at the input of the appropriate output amplifier in section 11 and with the 180 degree phase-shifted common output of section 10 applied to the same summing circuit, a talking party's own signal will be canceled in the output amplifier connected to his conference set but will be present in the output amplifier connected to the conference set of all other parties in the same conference call. The output terminals for the individual output amplifiers in section 11 are indicated generally by the connections 17 which carry the resultant suppressed sidetone signals to the individual conference sets.

The conference call network as represented by the above described input section 10 and the output section 11 may be easily combined with several similar networks to form a conference system. The individual networks are combined in a conference system by shifting the position of switch 18 so that the common output at 14 from input section 10 is connected to one of a plurality of inputs 19 on signal combining attenuator pad 20. The common output at 21 of combining attenuator pad 20 is applied to group section 22 which includes a plurality of intermediate group conference amplifiers having their inputs connected in common to output 21 of combining attenuator pad 20. The group conference amplifiers present negative impedances which just compensate for the attenuation and phase shift sustained by signals passing through combining attenuator pad 20. The respective outputs of the group conference amplifiers are individually connected to the input 16 of the output section 11 of each different conference call network over its associated conductor 23 and switch 24.

Referring now to the remaining FIGURES 2 through 5, there are illustrated specific circuits which may be employed in the general block diagram of FIGURE 1 to carry out a number of the above described functions. FIGURE 2 illustrates a conventional transistorized audio amplifier which may be employed as an input amplifier in section 10 in the conference call network of FIGURE 1. The amplifier of FIGURE 2 is capable of producing an output signal at terminal 30 which is phase shifted by 180 degrees from the input signal applied at terminal 31. All the individual party signals in a given conference call are applied to input terminal 31 and are combined in the amplifier such that they may be phase shifted 180 degrees and present simultaneously at output terminal 30.

Figure 3:
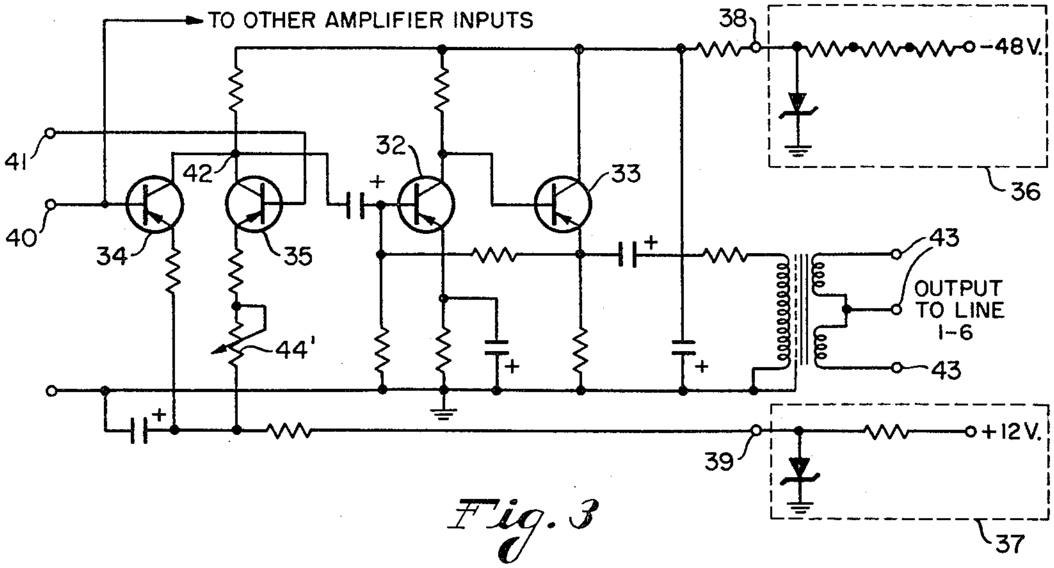
FIGURE 3 illustrates a summing circuit and two-stage amplifier which may be employed as an output amplifier in a conference call network as illustrated by the general block diagram of FIGURE 1.

FIGURE 3 illustrates a transistorized amplifier circuit which may be employed as one of the output amplifiers in section 11 of a conference call network as illustrated in FIGURE 1. The circuit shown consists basically of a two-stage amplifier consisting of properly biased transistors 32 and 33 preceded by an ultrastable summing circuit represented by transistors 34 and 35. Preferably, one such circuit, as illustrated in FIGURE 2, is provided for each party in a conference call. A plurality of FIGURE 3 circuits, employed in section 11 of a conference call network of FIGURE 1, may be mounted on one unit or card assembly. With all the output amplifiers associated with a given conference network mounted on the same card assembly, Zener diode power supply regulator circuits, such as 36 and 37, may be provided which are common to all the circuits on the same assembly. Terminals for common connection between the circuits are represented at 38 and 39. The common regulator circuits 36 and 37 minimize power supply variations and provide decoupling between the individual circuits.

In the event that only one conference call network is utilized, a connection is made from the common output terminal 30 of the input amplifier of FIGURE 2 to a common input terminal 40 at the base of transistor 34 in each summing circuit of FIGURE 3. Each individual party input applied to terminal 31 and combined in an input amplifier of FIGURE 2 is also applied individually to a terminal 41 on each of the circuits illustrated in FIGURE 3. Terminal 41 is connected to the base of transistor 35. The signal present at terminal 41 and applied to the base of transistor 35 will be canceled at terminal 42 by the same signal phase shifted by 180 degrees which is applied to the base of transistor 34 and combined with the signal at 41 in the summing circuit composed of transistors 34 and 35. Consequently, the output signal at terminals 43 of each output amplifier may carry the signal from the transmitter of all conference sets except one, the canceled signal being different at each output of the output amplifiers in the conference call network.

Thus, sidetone coupling created by a simultaneous difference in the energy level of the same signal present in the transistor and receiver of a subscriber's conference set may be adequately eliminated or substantially balanced out by cancellation of the individual party's own signal before sending the conference call to the receiver in his conference set. The elimination or balancing out of a party's own signal may be adjusted for each individual party by changing a variable potentiometer 44', preferably located on the emitter side of transistor 35 in the summing circuit of each output amplifier as shown in FIGURE 3. A feedback loop in the amplifier of FIGURE 2 through resistances 44, 45, 46 and 47 is provided with terminal connections 48, 49, 50, 51 and 52 which enable short circuiting of the resistances to insure the proper output amplitude and that the phase of the output signal at terminal 30 is substantially 180 degrees different from the phase of the input signal at terminal 31.

In the event that several conference call networks are combined to form a conference system, the output 30 from the input amplifier in each conference call network is applied to a separate one of inputs 60, each of which is associated with a different attenuator section of signal combining attenuator pad 20, illustrated in FIGURE 5. Each attenuator section of signal combining attenuator pad 20 is provided with series connected resistances, such as 61, 62, 63, 64, 65 and 66, and terminal connections, such as 67, 68, 69, 70, 71 and 72, between the resistances to enable suitable strapping to be utilized to short circuit any number of the resistances. This permits the attenuation and phase shift of the signal applied at any input terminal 60 to be individually adjusted. The individual attenuated signals are combined at common output terminal 75.

FIGURE 4 illustrates an arrangement of group amplifiers having their inputs connected in parallel to which the combined signal from terminal 75 is applied at common input terminal 80. Each separate group amplifier corresponds to an individual conference call network. The common input terminal 80 is connected to the base of an input transistor, such as 81, in each group amplifier. A feedback circuit from the output terminal of each group amplifier, such as output terminal 82, is provided through a series of resistances to the emitter of input transistor 81. By selectively short circuiting the resistances in the feedback circuit, the gain and phase shift of each group amplifier can be adjusted to just make up for the attenuation and phase shift by that attenuator section of combining attenuator pad 20, illustrated in FIGURE 5, which is associated with that conference call network with which that group amplifier corresponds. The output of each respective group amplifier, such as outputs 82, 83, 84 and 85, is applied to the input of the output section 11 of that conference call network with which that group amplifier corresponds.

Thus, although the output of each group amplifier includes the combined signals of all conference calls of all conference call networks of the conference call systems, each of these signals will be returned to the conference call network from which it originated with the proper power level and phase to permit it to be canceled in the same manner as previously described in connection with a system composed of solely a single conference call network.

Thus, it will be readily apparent to those skilled in the art that the present invention provides a conference system with adequate sidetone suppression which is capable of handling a very large number of parties, or conference call circuits. The arrangement and types of components employed within this invention may be subject to numerous modifications well within the purview of this invention and we intend to be limited only to a liberal construction of the appended claims.

What is claimed is:

1. A conference telephone system including a plurality of conference telephone networks having suppressed sidetones, each network comprising an input section and an output section individual to said input section, each input section being provided with a plurality of input terminals and a common output terminal, signal combining means for combining signals at said input terminals into a composite signal and phase shifting means for shifting the phase of said composite signal included in each input section, and a plurality of signal summing means included in each output section, first means coupling a first input of each signal summing means to a respective input terminal on said input section corresponding to said output summing means, and said system further comprising second means for coupling the common output of each input section to another input of each of said signal summing means of the output section individual thereto to enable the formation of a plurality of composite output signals each having cancelled therefrom a different signal present on at least one of said plurality of input terminals, wherein said second means includes group combining means having a plurality of input terminals each corresponding to a different one of said networks and a plurality of output terminals each corresponding to a different one of said networks for applying to each output terminal thereof a respective output signal which is a composite of all the input signals applied to all the input terminals thereof, individual means for connecting the common output terminal of the input section of each respective network to the input terminal of said group combining means corresponding thereto, and individual means for connecting each respective output terminal of said group combining means to the signal summing means of the output section of the network with which it corresponds.

2. A conference telephone system according to claim 1 wherein said combining means and said phase shifting means are adapted to produce a common signal output having a plurality of portions corresponding to and 180 degrees different in phase from a plurality of signals present on the plurality of input terminals to said input section.

3. The conference telephone system of claim 1 wherein said output section includes a plurality of two-stage transistorized amplifiers following each summing means.

4. A conference telephone system according to claim 1 wherein said summing means comprises a number of summing circuits, said summing circuits preceding a number of amplifying circuits at the input of said output section, both the number of said summing circuits and said amplifying circuits corresponding to the number of inputs to said input section.

5. A conference telephone system according to claim 4 wherein each said summing circuit is connected to only one of said amplifying circuits.

6. The conference telephone system of claim 1 wherein said summing means are ultrastable transistorized devices.

7. A conference system according to claim 1 wherein said group combining means includes individual adjustable means corresponding to each network for ensuring that the phase and power level of that portion of the composite signal appearing at any respective output terminal of said group combining means which is attributable to the input signal applied to that input terminal which corresponds to the same network as that output terminal is equal to the phase and power level of that input signal.

8. A conference system in accordance with claim 1 wherein said group combining means includes a signal combining attenuator pad comprising an individual attenuator section corresponding to each of said networks having one end thereof connected to the input terminal of said group combining means corresponding thereto and a common attenuator section serially connected to the other end of all said individual attenuator sections for deriving a common output signal from said signal combining attenuator pad which is a composite of all the input signals applied to the input terminals of said group combining means, and said group combining means further including a group amplifier section including an individual amplifier having a negative feedback loop corresponding to each network, means for applying the common output signal from said signal combining attenuator pad to the input of each of said amplifiers, and means for applying the output of each respective amplifier to that output terminal of said group combining means which corresponds therewith.

9. A conference system in accordance with claim 8 wherein said individual attenuator sections and said negative feedback loop of each individual amplifier is adjustable to provide the amplifier corresponding to each network with an effective negative impedance which is substantially equal and opposite to the effective positive impedance of that attenuator section corresponding to that network.

References Cited

UNITED STATES PATENTS

| | | | |
|---|---|---|---|
| 3,060,265 | 10/1962 | Duncan et al. | 179—81 |
| 3,105,877 | 10/1963 | Miller et al. | 179—1 |

KATHLEEN H. CLAFFY, *Primary Examiner.*

R. P. TAYLOR, *Assistant Examiner.*